(12) United States Patent
Kight

(10) Patent No.: US 6,786,036 B2
(45) Date of Patent: Sep. 7, 2004

(54) BIMODAL FAN, HEAT EXCHANGER AND BYPASS AIR SUPERCHARGING FOR PISTON OR ROTARY DRIVEN TURBINE

(76) Inventor: Matthew Scott Kight, 730 Park Dr. NE., Atlanta, GA (US) 30306

( * ) Notice: Subject to any disclaimer, the term of this patent is extended or adjusted under 35 U.S.C. 154(b) by 46 days.

(21) Appl. No.: 10/131,144

(22) Filed: Apr. 25, 2002

(65) Prior Publication Data

US 2002/0162318 A1 Nov. 7, 2002

Related U.S. Application Data

(60) Provisional application No. 60/286,517, filed on Apr. 27, 2001.

(51) Int. Cl.[7] .......................... B63H 11/00; B64G 9/00; F02K 9/00; F03H 9/00; F23R 9/00
(52) U.S. Cl. .......................... 60/204; 60/269; 60/200.1; 60/226.1
(58) Field of Search .......................... 60/204, 269, 262, 60/226.1, 200.1, 226.3; 123/25 A

(56) References Cited

U.S. PATENT DOCUMENTS

| | | | | |
|---|---|---|---|---|
| 4,292,802 A | * | 10/1981 | Snow .......................... | 60/204 |
| 5,315,821 A | * | 5/1994 | Dunbar et al. .............. | 60/226.1 |
| 5,345,760 A | * | 9/1994 | Giffin, III .................. | 60/226.1 |
| 5,369,954 A | * | 12/1994 | Stuart ........................ | 60/226.1 |
| 5,692,372 A | * | 12/1997 | Whurr ........................ | 60/226.1 |
| 5,860,275 A | * | 1/1999 | Newton et al. ............. | 60/226.1 |
| 6,073,439 A | * | 6/2000 | Beaven et al. ................ | 60/223 |
| 6,079,200 A | * | 6/2000 | Tubbs ........................ | 60/226.1 |
| 6,098,399 A | * | 8/2000 | Richards et al. .............. | 60/223 |
| 6,109,022 A | * | 8/2000 | Allen et al. .................. | 60/223 |
| 6,205,771 B1 | * | 3/2001 | Rowe ........................ | 60/226.1 |
| 6,494,032 B2 | * | 12/2002 | Udall et al. .................. | 60/223 |
| 2002/0073690 A1 | * | 6/2002 | Tse ............................ | 60/204 |

* cited by examiner

*Primary Examiner*—Justine R. Yu
*Assistant Examiner*—William H. Rodriguez
(74) *Attorney, Agent, or Firm*—Robert Platt Bell

(57) ABSTRACT

The present invention relates to turbine fan aircraft use. In particular, the present invention is directed toward a turbine fan driven by a piston or rotary (e.g., Wankel) engine. The present invention makes possible the most flexible and effective installation of a ducted fan with a fixed horsepower source, namely a conventional internal combustion engine. Effectiveness being defined as full utilization of the engine's available horsepower at the chosen flight points. In a further embodiment of the present invention, a novel heat exchanger may be provided which removes waste heat with minimal drag while boosting the fan system's effective thermal efficiency by increasing the enthalpy of the working fluid. In yet another embodiment of the present invention, bypass air from the turbine may be used to supercharge the piston or rotary engine.

22 Claims, 4 Drawing Sheets

Sect A-A

BIMODAL FAN, HEAT EXCHANGER AND BYPASS AIR SUPERCHARGING FOR PISTON OR ROTARY DRIVEN TURBINE

CROSS-REFERENCE TO RELATED APPLICATIONS

The present application claims priority from Provisional U.S. Patent Application No. 60/286,517 filed on Apr. 27, 2001, and incorporated herein by reference.

FIELD OF THE INVENTION

The present invention relates to turbine fan aircraft use. In particular, the present invention is directed toward a turbine fan driven by an Otto cycle engine such as a piston or rotary (e.g., Wankel) engine. The present invention makes possible the most flexible and effective installation of a ducted fan with a fixed horsepower source, namely a conventional Otto Cycle engine Effectiveness being defined as full utilization of the engine's available horsepower at the chosen flight points. In a further embodiment of the present invention, a novel heat exchanger is provided which removes waste heat with minimal drag while boosting the fan system's effective thermal efficiency by increasing the enthalpy of the working fluid. In yet another embodiment of the present invention bypass air from the turbine is used to supercharge the piston or rotary engine.

BACKGROUND OF THE INVENTION

Gas turbine engines (e.g., Jet, fanjet, and the like) are known in the art for propelling jet aircraft. While powerful and efficient, they are very costly to purchase and maintain, placing them out of the reach of most individual aircraft owners, hobbyists, and homebuilders.

Ducted fans are also known in the art. Ducted fans are typically driven by piston engines or, in some instances, rotary (e.g., wankel) engines. A ducted fan typically comprises a propeller rotating within a duct housing. The duct reduces tip losses significantly. However, the drag created by the duct can be significant. As a result, ducted fans generally work best only at lower speeds.

Thus, a need exists in the art to provide a low-cost turbine type propulsion system which is affordable. The present inventor has experimented with driving turbines with Otto Cycle engines (e.g., piston engines and the like) with success. However, such a design presents problems when operating at altitude versus seal level.

If one uses a conventional fan of a given flow rate and pressure ratio coupled to a fixed horsepower source a problem arises as a result of changing air density with altitude. If the aircraft mission is to cruise as fast as possible, while using minimum power and fuel, climbing to high altitude is the most practical way to accomplish this. The thinner air at 35,000 feet produces much less drag than at sea level, and makes it possible to fly at high speed on quite limited horsepower.

The problem with the conventional fan/fixed horsepower source combination, is that if the designer optimizes the fan for high altitude cruise, there may be nowhere near enough horsepower to drive the fan at sea level (because of higher air density) and takeoff performance may be severely impaired. If on the other hand the designer optimizes the fan for takeoff, then cruise performance sufferers as the fan can't ingest enough air to fully absorb the engines horsepower.

With the operation of conventional Otto Cycle engines, it is known that only about 25% of the heat energy produced by burning fuel actually goes to mechanical energy. Approximately 30% may be lost through the primary cooling system, 35% goes out the exhaust, and the remainder, about 15% may be radiated from the engine itself. The waste heat represents a potential resource for augmenting thrust, improving performance and reducing fuel consumption.

In a typical aircraft application using an Otto Cycle engine, provision must be made for removal of waste heat. This may be typically accomplished by an exhaust pipe vented to the atmosphere, and cooling air routed to a heat exchanger. While these methods have worked effectively for a long time they are not set up so as to benefit the aircraft, only getting rid of the waste heat.

Aircraft use less fuel at a given speed the higher they go, but their is a limit to how high they can go without the use of a turbo-supercharger. Adding a turbo-supercharger adds weight, cost, and heat to the engine compartment. A need exists, therefore, to provide such supercharging or other altitude compensation without the added weight and complexity of a supercharger or turbo-supercharger.

Water injection for boosting the output of internal combustion engines has been used for many years. During WWII, all the major participants used some version of this idea on their fighter aircraft. The water must be injected as a fine mist to get the optimum benefit. The finer the mist the better; the small droplets have much more surface area than do large droplets, and therefore absorb the heat energy in the combustion chamber more efficiently.

When the water droplets are subjected to the heat and pressure in the combustion chamber, their volume increases more than the volume increase from heating the same mass of air. This results in greater cylinder pressure for the same heat released in the combustion chamber, and more horsepower. There are other benefits too; the water droplets stabilize and smooth the flame front in the combustion chamber suppressing detonation. By suppressing detonation, the engine can operate at higher BMEP (brake mean effective pressure), which also equates to greater horsepower.

The only downside is a higher rate of acid build up in the oil, which is detrimental to the engines bearing surfaces. This happens without water injection, as part of the normal bi-product of combustion is water vapor which combines in the oil to form acids. An engine using water injection would have to have its oil changed more frequently.

Prior Art water injection systems typically employed an atomizer type misting sprayer to inject water droplets into the intake of an engine. However, such an atomizer sprayer may not provide consistent, uniform, and small enough droplets of water. A finer and more consistent mist may provide better performance for a water injection system.

SUMMARY OF THE INVENTION

The solution to the above mentioned problems, is to use what is termed herein a bimodal Fan. The fan is designed to be able to vary its flow rate and therefore its thrust and power requirement. Pressure ratio does not change. This is analogous to a variable pitch propeller which changes its pitch with decreasing air density and increasing airspeed to optimize performance. This is accomplished in the bimodal Fan by having two concentric but separate flow paths. The inner flow path may be fully open all the time and may be sized to provide best take off performance with the horsepower available. The second, outer flow path, concentric to the first, may be fully closed at take off, by a radial array of movable vanes or shutters.

In a second embodiment of the present invention, a low loss heat exchanger may be provided, the purpose of which is to transfer the waste heat of the Otto Cycle engine, (from the exhaust and cooling water), directly to the fan discharge air down stream of the fan. This serves two purposes: removal of he engine's waste heat, and boosting the fan system's effective thermal efficiency by increasing the enthalpy of the working fluid (fan discharge air). The heat exchanger may be constructed of a cluster of thin walled tubes which vary in cross sectional shape.

Using the primary fan to supercharge the engine provides an additional 6–8,000 feet of altitude capability, increasing cruising speed and lowering fuel consumption for a given speed and reducing engine wear. It also may be beneficial to a turbo-charged engine by either increasing its altitude capability over that offered by the turbo-charger alone, or reduce engine wear by letting the turbo-charger operate at a lower boost pressure than it would by itself but maintaining the same level of performance. The fan supercharger system is very simple: pressurized air from the inner fan flow path may be routed through hollow struts that inject it into a collector plenum which may be attached to the outside of the outer flow path shell.

In another embodiment of the present invention, an air mister nozzle uses high velocity air through an annular orifice. Instead of the classic perfume type mister (atomizer) which is an air jet intersecting a small water tube, this nozzle uses air from a small centrifugal blower or fan, to create the same bernoulli effect. The crucial difference is the geometry and construction of the nozzle itself. Air enters through the rear of the nozzle and passes through an array of holes into a plenum chamber.

The center bullet provides the contour for the narrow annular nozzle. The bullet is concentric to the nozzle body and fastened in place by a lock-nut. The narrow annular gap is on the order of 0.010 inches all the way around. The advantage of this, is that it provides the opportunity to precisely control the entry of the water into the high velocity flow stream. This is accomplished by a circumferential gap leading from an annular water chamber to the nozzle annulus.

Water is metered through a simple orifice (not shown) and brought to the nozzle by flexible tubing. The water enters the nozzle and fills the annular water chamber which feeds water to the circumferential gap introducing water into the airflow. As water emerges from the small gap, the shearing action of the high velocity air forms the small droplets desired for this application. This type of nozzle allows for even, efficient distribution of water with a limited amount of air mass flow, and at modest pressures.

DETAILED DESCRIPTION OF THE INVENTION

The solution to the above mentioned problems, is to use what is termed herein a bimodal Fan. The fan is designed to be able to vary its flow rate and therefore its thrust and power requirement. Pressure ratio does not change. This is analogous to a variable pitch propeller which changes its pitch with decreasing air density and increasing airspeed to optimize performance.

Figure 1:
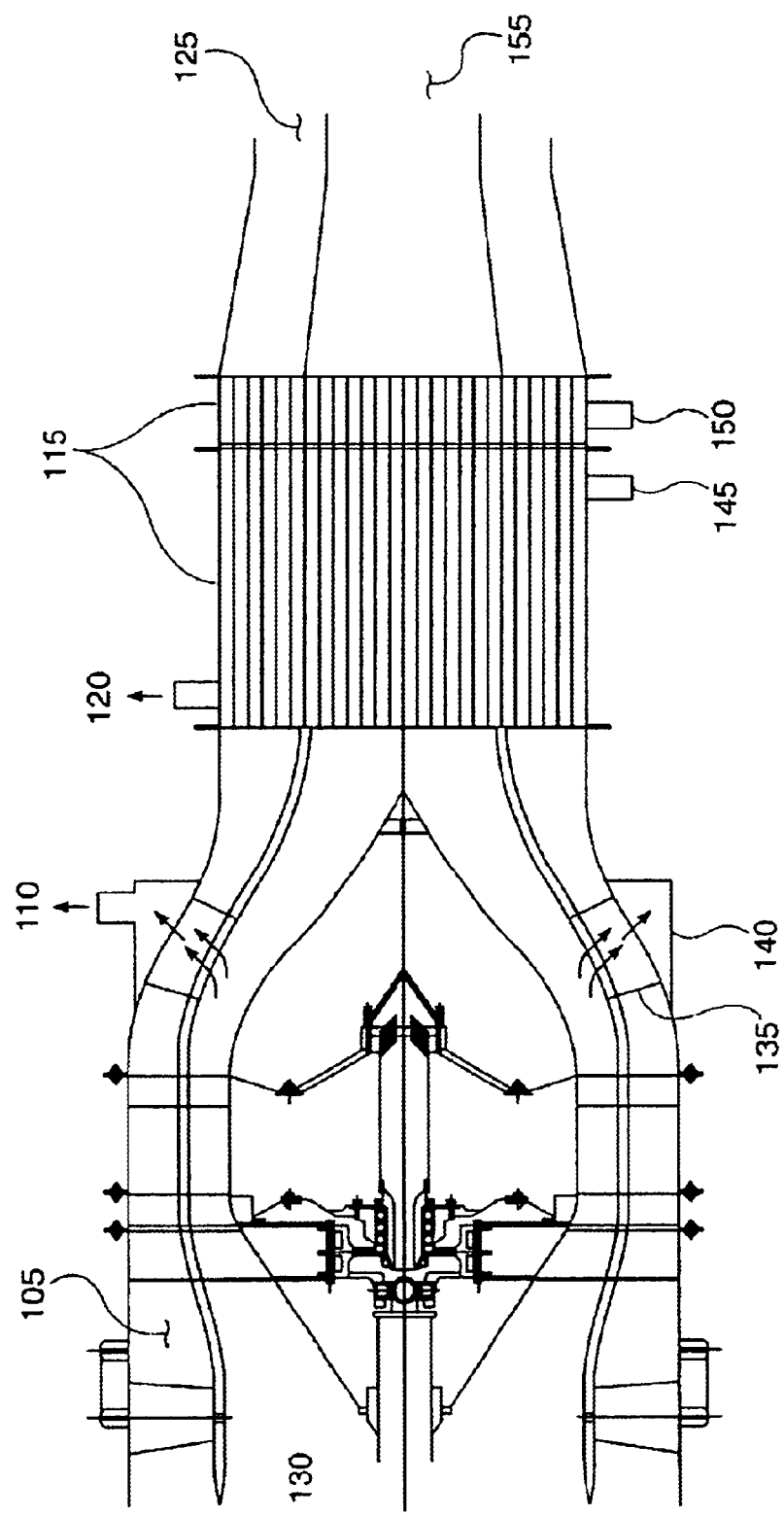
FIG. 1 is a side cutaway view of the apparatus of the present invention.

FIG. 1 is a side cutaway view of the apparatus of bimodal Fan of the present invention illustrating the two concentric but separate flow paths. Inner flow path 130 may be fully open all the time and may be sized to provide best take off performance with the horsepower available. The second, outer flow path 105, concentric to the first, may be fully closed at take off, by a radial array of movable vanes or shutters 245. Each vane 245 rides in a conventional bushing 230 and has a crank arm 215 attached to the outer end of its pivot shaft 210.

Figure 2:
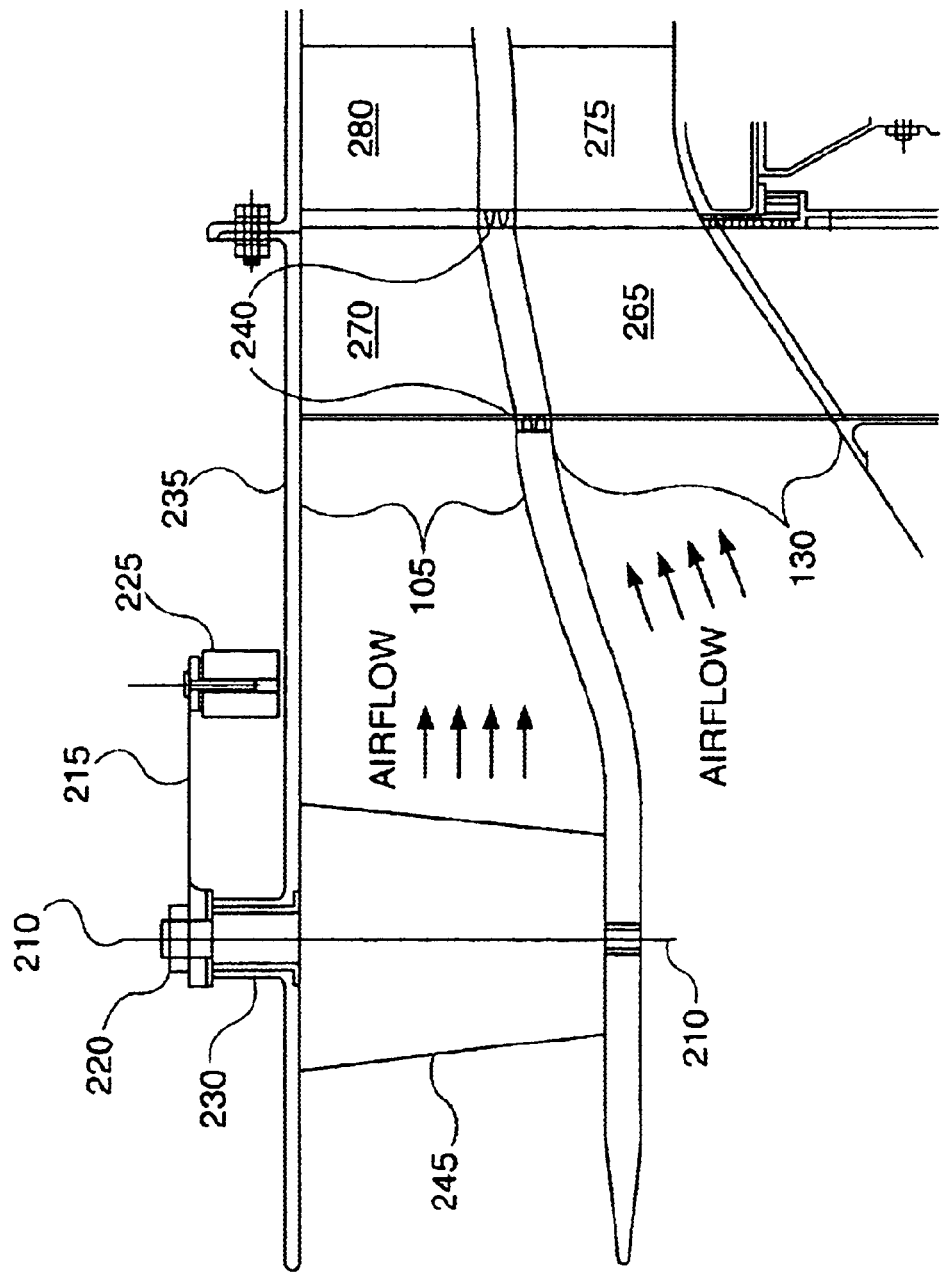
FIG. 2 is an enlarged view of a portion of FIG. 1 illustrating further details of the present invention.

FIG. 2 is an enlarged view of a portion of FIG. 1 illustrating further details of the present invention. Vane arms 215 may be in turn pinned to a synch-ring 225 which rides around the periphery of the fan case 235 and may be actuated by conventional means; (i.e., a pneumatic cylinder, hydraulic cylinder, mechanical gears, sprockets or the like). Sealing between the inner flow path 130 and outer flow path 105 may be accomplished by conventional labyrinth air seals 240.

FIG. 2 also illustrates the relationship between inner rotor blade 265, attached to outer rotor blade 270. Inner stator 275 interacts with inner rotor 265 while outer stator 280 interacts with outer rotor 270 to produce thrust in two concentric paths.

As altitude increases, vanes 245 may be gradually opened by the pilot to increase airflow, and therefore thrust and airspeed. Likewise as the pilot descends, the vanes 245 may be gradually closed to prevent overloading of the engine, and provide for optimum low altitude thrust for approach and landing.

While the fan is operating in the low altitude configuration, (outer flow path 105 closed), the outer fan 270 may be turning at the same speed, but may be in fact stalled and using up some of the available power somewhat by "beating up" the air inside the outer flow path 105. This may be referred to as windage loss, and would degrade low altitude performance somewhat.

Also, as the inlet may be sized for cruise at high altitude it may be too large at low altitude resulting in "spillage drag", which may be the result of the excess air regurgitating out of the mouth of the inlet, and "spilling" down the sides of the aircraft increasing turbulence and drag, thus reducing performance during low altitude climb.

This may be eliminated with a variable inlet, but at the price of increased weight, complexity and cost, obviously, the bimodal Fan may be more expensive and slightly heavier than a conventional fan of the same size, however this should be more than offset by the bimodal fan's performance advantages.

The bimodal fan makes it possible to operate a conventional Otto Cycle engine at speeds beyond the reach of conventional propellers and be less costly to buy and operate than a gas turbine of similar performance. However, the bimodal fan of the present invention may be applied to many types of engines, including gas turbines and the like.

In a second embodiment of the present invention, a low loss heat exchanger 115 may be provided, the purpose of which is to transfer the waste heat of the Otto Cycle engine, (from the exhaust and cooling water), directly to the fan discharge air down stream of the fan. This serves two purposes; removal of the engine's waste heat, and boosting the fan system's effective thermal efficiency by increasing the enthalpy of the working fluid (fan discharge air). Heat exchanger 115 may be constructed of a cluster of thin walled tubes which vary in cross sectional shape.

At inlet end, the tube ends may be hexagonal in shape, nested together in a bundle to form a honeycomb arrangement. This should allow for an inlet to heat exchanger 115 that has minimal blockage drag effect for the incoming fan discharge air and minimal total pressure loss. The shape of the tube then transitions to a circular cross section so that cooling water medium can flow around it. After a given length the circular tube reverts back to the same hexagonal cross section shape to allow smooth exit of the fan discharge air.

Heat exchanger 115 for the cooling water may be fabricated from thin walled Aluminum tubing assembled into a bundle long enough to allow sufficient heat transfer form the cooling water to the fan discharge air. Cooling water may be fed in through inlet 145 and return to the engine via outlet 120. The cooling water heat exchanger 115 may be followed by similar but shorter heat exchanger for the exhaust gases, fed with exhaust gases 150 as an inlet, with the exhaust gases exiting into the air stream of the fan through the inner nozzle 155, only.

The exhaust heat exchanger 115 may be fabricated from a welded bundle of thin walled stainless steel tubes also starting with a hexagonal cross section. The tube bundle has a sheet metal shell around it to channel the entry of the engine exhaust gases through inlet 150. The exhaust gases impinge on the outside of the tubes in the section where the tubes may be circular in cross section. The front hexagonal section may be welded between tubes to hold the tubes together in the bundle and seal the exhaust gases.

The middle circular cross section allows for some heat transfer form the exhaust gases to the fan discharge air, but also functions as a manifold to evenly distribute the exhaust gases within the fan discharge tube. Lastly the tubes revert to their hexagonal cross section but with one important difference. The tubes nest together, but the gaps between the tubes may be not welded shut. The gaps allow the exhaust gases to squirt into the fan discharge stream 155 only, in an evenly distributed manner.

By using this honeycomb distribution method, the fan stream air should be heated evenly with low total pressure loss; which results in a net gain of the fluid velocity and an increase in fan system's thrust and efficiency.

The addition of these heat exchanger 115 may add cost, and modest amount of weight, which may be viewed a penalty. Also, even though the hexagonal configuration should have a minimal total pressure loss penalty, it won't be zero.

Using the primary fan to supercharge the engine provides an additional 6,000 to 8,000 feet of altitude capability, increasing cruising speed and lowering fuel consumption for a given speed and reducing engine wear. It also may be beneficial to a turbo-charged engine by either increasing its altitude capability over that offered by the turbo-charger alone, or reduce engine wear by letting the turbo-charger operate at a lower boost pressure than it would by itself but maintaining the same level of performance.

The fan supercharger system is very simple: pressurized air 110 from the inner fan flow path may be routed through hollow struts 135 that inject it into a collector plenum 140 which may be attached to case 235 outside of outer flow path 105. At the top of the annular collector plenum 140 may be a pipe nipple to attach a hose that transmits the higher pressure air directly to the intake system of the Otto Cycle engine, or the inlet to the turbo-supercharger. The penalties of this system may be small. There may be a slight weight, cost, complexity increase. However, such system may in fact be less costly and weigh less than a conventional turbo or super-charger.

Figure 3:
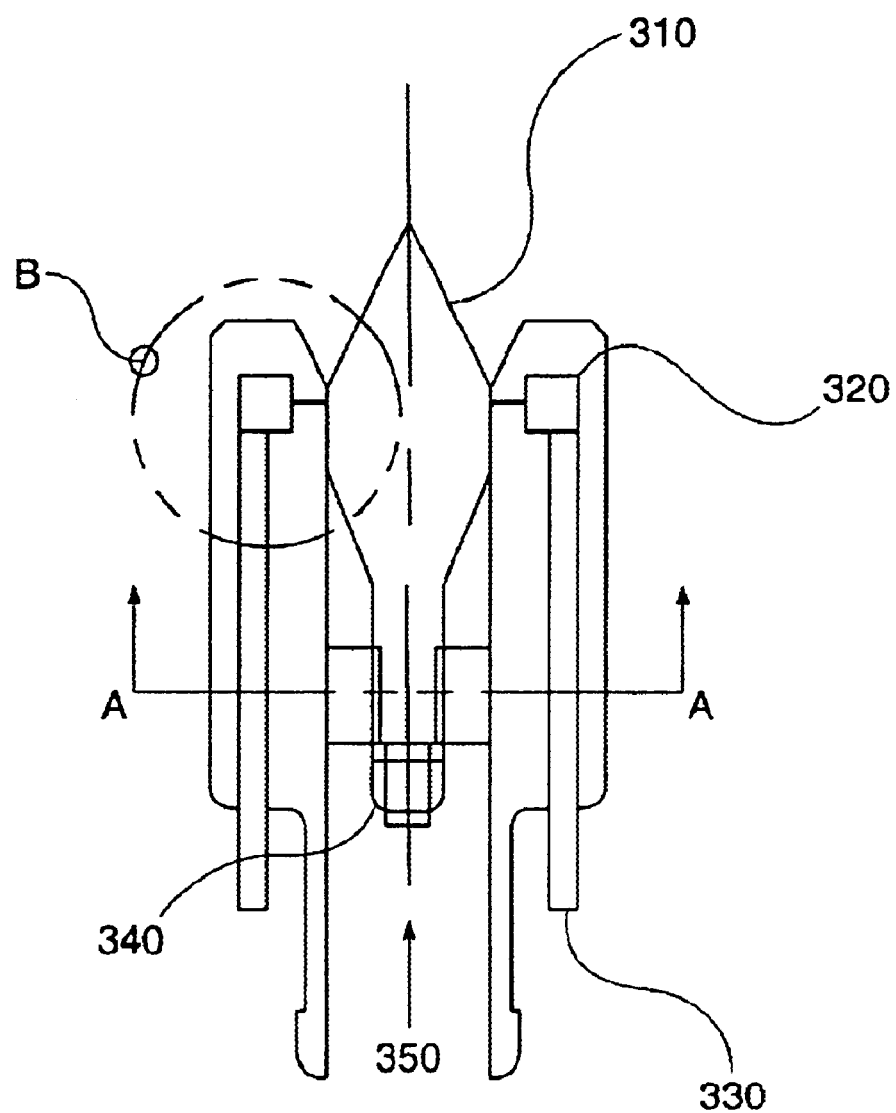
FIG. 3 is a side cutaway view of the water nozzle of an alterative embodiment of the present invention.
Figure 4:
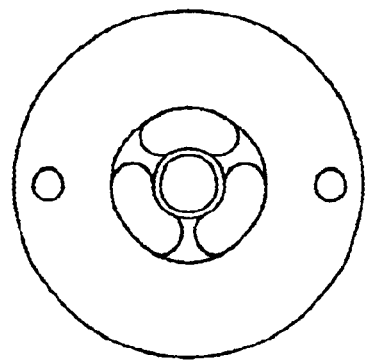
FIG. 4 is a cross-section view of the water nozzle of FIG. 3 along line A—A.
Figure 5:
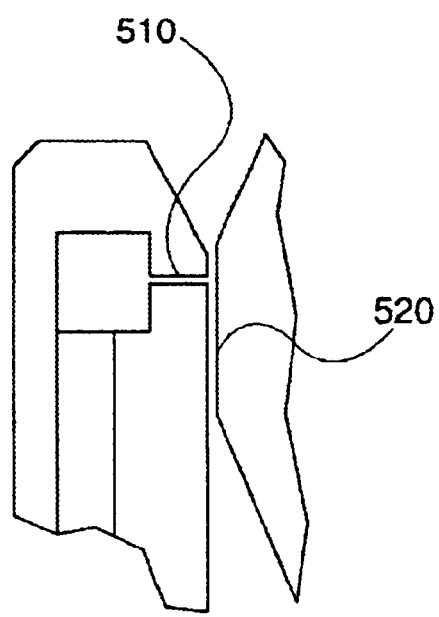
FIG. 5 is an enlargement of area B of the water nozzle of FIG. 3.

FIG. 3 is a side cutaway view of the water nozzle of an alterative embodiment of the present invention. FIG. 4 is a cross-section view of the water nozzle of FIG. 3 along line A—A. FIG. 5 is an enlargement of area B of the water nozzle of FIG. 3. In this embodiment of the present invention, an air mister nozzle uses high velocity air through an annular orifice 520. Instead of the classic perfume type mister (atomizer) which is an air jet intersecting a small water tube, this nozzle uses air from a small centrifugal blower or fan, to create the same bernoulli effect.

The crucial difference is the geometry and construction of the nozzle itself. Air enters through the rear 350 of the nozzle and passes through an array of holes into a plenum chamber (See, FIG. 4). Center bullet 310 provides the contour for the narrow annular nozzle 520. Center bullet 310 is concentric to the nozzle body and fastened in place by a lock-nut 340. The narrow annular gap 520 is on the order of 0.010 inches all the way around.

Water enters through inlet 330 into annular water chamber 320. The advantage of this arrangement is that it provides the opportunity to precisely control the entry of the water into the high velocity flow stream. This is accomplished by a circumferential gap 510 leading from the annular water chamber 320 to the nozzle annulus. Water is metered through a simple orifice (not shown) and brought to the nozzle by flexible tubing. The water enters the nozzle and fills the annular water chamber 320 which feeds water to the circumferential gap 510 introducing water into the airflow.

As water emerges from the small gap 510, the shearing action of the high velocity air forms the small droplets desired for this application. This type of nozzle allows for even, efficient distribution of water with a limited amount of air mass flow, and at modest pressures. Development and testing may determine the optimal size for bullet 310, annular nozzle size, to circumferential gap size to produce optimal droplet size and spray pattern for a given air flow/pressure for a given application. The metering orifice can be changed or even made variable to control flow.

An optional embodiment may include a dual circuit where the nozzle could be fed by two separate water circuits, each with its own metering orifice; one for max load condition, and one for cruise condition.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A bimodal fan having a variable flow rate and thrust and power requirement without changing its pressure ratio, said bimodal fan comprising:
 a fan, driven by an Otto Cycle engine;
 a duct, enclosing the fan, for directing flow of air from the fan; and
 two concentric but separate flow paths within said duct, said flow paths including:
  a first, inner low path fully open all the time and sized to provide best take of performance with available horsepower, and;
  a second, outer flow path, concentric to the first, inner flow path, said second, outer flow path including a radial array of movable vanes for varying the flow through the second, outer flow path.

2. The bimodal fan of claim 1 wherein the movable vanes are closed at takeoff and opened at altitude to provide additional thrust.

3. A bimodal fan having a variable flow rate and thrust and power requirement without changing its pressure ratio, said bimodal fan comprising:
 a fan, driven by an Otto Cycle engine;
 a duct, enclosing the fan, for directing flow of air from the fan; and two concentric but separate flow paths within said duct said flow paths including:
  a first, inner flow path fully open all the time and sized to provide best take off performance with available horsepower, and;
  a second, outer flow path, concentric to the first, inner flow path, said second, outer flow path including a radial array of movable vanes for varying the flow through the second, outer flow path; and
a low loss heat exchanger provided in at least one of the first and second flow paths, for transferring waste heat of the Otto cycle combustion engine from a least one of exhaust and cooling water, directly to fan discharge air down stream of the fan so as to remove the engine waste heat, and boost the fan system effective thermal efficiency by increasing the enthalpy of fan discharge air, the heat exchanger comprising a cluster of thin walled tubes which vary in cross sectional shape.

4. The bimodal fan of claim 3, further comprising a supercharge using the fan to supercharge the engine to provide an additional altitude capability, increasing cruising speed and lowering fuel consumption for a given speed and reducing engine wear by diverting pressurized air from the inner fan flow path through hollow struts which inject the pressurized air into a collector plenum which is attached to the outside of said duct in the outer flow path.

5. The bimodal fan of claim 3 wherein the movable vanes are closed at takeoff and opened at altitude to provide additional thrust.

6. A bimodal fan having a variable flow rate and thrust and power requirement without changing its pressure ratio, said bimodal fan comprising:
  a fan, driven by an engine;
  a duct, enclosing the fan, for directing flow of air from the fan; and
  two concentric but separate flow paths within said duct, said flow paths including:
    a first, inner flow path fully open all the time and sized to provide best take of performance with available horsepower, and;
    a second, outer flow path, concentric to the first, inner flow path, said second, outer flow path including a radial array of movable vanes for varying the flow through the second, outer flow path; and
  a water injection system, coupled to said engine, for injecting water into an intake of said engine to reduce detonation and increase horsepower output of said engine, said water injection system comprising:
  a nozzle body, coupled to the intake of said engine, said nozzle body receiving pressurized air from the duct through the rear of the nozzle body and passing through an array of holes into a plenum chamber;
  a center bullet, provided within the nozzle, for providing a contour for a narrow nozzle annulus, said bullet being concentric to the nozzle body;
  a narrow annular gap, formed between the center bullet and nozzle body;
  an annular water chamber, formed in the nozzle body, for receiving pressurized water from a pressurized water source; and
  a circumferential gap leading from said annular water chamber to the nozzle annulus.

7. The bimodal fan of claim 6, wherein water enters the nozzle body and fills the annular water chamber which feeds water to the circumferential gap introducing water into the airflow such that as water emerges from the circumferential gap, the shearing action of high velocity air through the nozzle body forms small droplets of water injected into the engine.

8. The bimodal fan of claim 6 wherein the movable vanes are closed at takeoff and opened at altitude to provide additional thrust.

9. A method of generating variable thrust from a ducted fan without changing its pressure ratio, the method of generating variable thrust from a ducted fan comprising the steps of:
  generating, using a fan driven by an Otto Cycle engine, a flow of air through a duct, enclosing the fan and directing flow of air from the fan, and
  diverting the flow of air through two concentric but separate flow paths within the duct, the flow paths including a first, inner flow path fully open all the time and sized to provide best take off performance with available horsepower, and a second, outer flow path, concentric to the first, inner flow path, the second, outer flow path including a radial array of movable vanes for varying the flow through the second, outer flow path.

10. The method of generating variable thrust from a ducted fan of claim 9 wherein the movable vanes are closed at takeoff and opened at altitude to provide additional thrust.

11. A method of generating variable thrust from a ducted fan without changing its pressure ratio, the method of generating variable thrust from a ducted fan comprising the steps of:
  generating, using a fan driven by an engine, a flow of air through a duct, enclosing the fan and directing flow of air from the fan,
  diverting the flow of air through two concentric but separate flow paths within the duct, the flow paths including a first, inner flow path fully open all the time and sized to provide best take off performance with available horsepower, and a second, outer flow path, concentric to the first, inner flow path, the second, outer flow path including a radial array of movable vanes for varying the flow through the second, outer flow path,
  directing the flow of air through a low loss heat exchanger provided in at least one of the first and second flow paths, and
  transferring waste heat of the engine from at least one of exhaust and cooling water directly to fan discharge air down stream of the fan so as to remove the engine waste heat, and boost the fan system effective thermal efficiency by increasing the enthalpy of fan discharge air.

12. The method of generating variable thrust from a ducted fan of claim 11, further comprising the steps of:
  using the fan to supercharge the engine to provide an additional altitude capability, increasing cruising speed and lowering fuel consumption for a given speed and reducing engine wear by diverting pressurized air from the inner fan flow path through hollow struts which inject the pressurized air into a collector plenum which is attached to the outside of the duct in the outer flow path.

13. The method of generating variable thrust from a ducted fan of claim 11 wherein the movable vanes are closed at takeoff and opened at altitude to provide additional thrust.

14. A method of generating variable thrust from a ducted fan without changing its pressure ratio, the method of generating variable thrust from a ducted fan comprising the steps of:
  generating, using a fan driven by an engine, a flow of air through a duct, enclosing the fan and directing flow of air from the fan,
  diverting the flow of air through two concentric but separate flow paths within the duct, the flow paths including a first, inner flow path fully open all the time and sized to provide best take off performance with available horsepower, and a second, outer flow path, concentric to the first, inner flow path, the second, outer flow path including a radial array of movable vanes for varying the flow through the second, outer flow path, injecting water into an intake of the engine to reduce detonation and increase horsepower output of the engine, said step of injecting water into the engine comprising the steps of providing a nozzle body, coupled to the intake of the engine, the nozzle body receiving pressurized air from the duct through the rear of the nozzle body and passing through an array of holes into a plenum chamber, providing a center bullet within the nozzle, for providing a contour for a narrow nozzle annulus, the bullet being concentric to the nozzle body, providing a narrow annular gap between the center bullet and nozzle body, providing an annular water chamber, formed in the nozzle body, for receiving pressurized water from a pressurized water source, and providing a circumferential gap leading from an annular water chamber to the nozzle annulus.

15. The method of generating variable thrust from a ducted fan of claim 14, wherein water enters the nozzle body and fills the annular water chamber which feeds water to the circumferential gap introducing water into the airflow such that as water emerges from the circumferential gap, the hearing action of high velocity air through the nozzle body forms small droplets of water injected into the engine.

16. The method of generating variable thrust from a ducted fan of claim 14 wherein the movable vanes are closed at takeoff and opened at altitude to provide additional thrust.

17. A water injection system for injecting water into an intake of an engine to reduce detonation and increase horsepower output of said engine, said water injection system comprising:

a nozzle body, coupled to the intake of said engine, said nozzle body receiving pressurized air through the rear of the nozzle body and passing through an array of holes into a plenum chamber;

a center bullet, provided within the nozzle, for providing a contour for a narrow nozzle annulus, said bullet being concentric to the nozzle body;

a narrow annular gap, formed between the center bullet and nozzle body;

an annular water chamber, formed in the nozzle body, for receiving pressurized water from a pressurized water source; and a circumferential gap leading from an annular water chamber to the nozzle annulus.

18. The water injection system of claim 17, wherein water enters the nozzle body and fills the annular water chamber which feeds water to the circumferential gap introducing water into the airflow such that as water emerges from the circumferential gap, the shearing action of high velocity air through the nozzle body forms small droplets of water injected into the engine.

19. A bimodal fan having a variable flow rate and thrust and power requirement without changing its pressure ratio, said bimodal fan comprising:

a fan, driven by an engine;

a duct, enclosing the fan, for directing flow of air from the fan; and two concentric but separate flow paths within said duct, said flow paths including:

a first, inner flow path fully open all the time and sized to provide best take of performance with available horsepower, and;

a second, outer flow path, concentric to the first, inner flow path, said second, outer flow path including a radial array of movable vanes mounted in the flow path before the fan, for varying the flow through the second, outer flow path.

20. A method of generating variable thrust from a ducted fan without changing its pressure ratio, the method of generating variable thrust from a ducted fan comprising the steps of:

generating, using a fan driven by an engine, a flow of air through a duct, enclosing the fan and directing flow of air from the fan, and diverting the flow of air through two concentric but separate flow paths within the duct, the flow paths including a first, inner flow path fully open all the time and sized to provide best take off performance with available horsepower, and a second, outer flow path, concentric to the first, inner flow path, the second, outer flow path including a radial array of movable vanes mounted in the duct ahead of the fan, for varying the flow through the second, outer flow path.

21. A bimodal fan having a variable flow rate and thrust and power requirement without changing its pressure ratio, said bimodal fan comprising:

a fan, driven by an engine, the fan comprising an inner first portion separated from an outer second portion, the first portion and second portion defining two concentric but separate flow paths;

a duct, enclosing the fan, for directing flow of air to and from the fan, the duct including the two concentric but separate flow paths within said duct, the said flow paths including:

a first, inner flow path duct portion fully open all the time and sized to provide best take off performance with available horsepower, the firs inner flow path duct portion ducting air to and from the inner first portion of the fan, and;

a second, outer flow path duct portion, concentric to the first, inner flow path, said second, outer flow path duct portion including a radial array of movable vanes mounted in the flow path before the fan, for varying the flow through the second, outer flow path duct portion, the second flow path duct portion ducting air to and from the outer second portion of the fan.

22. A method of generating variable thrust from a ducted fan without changing its pressure ratio, the method of generating variable thrust from a ducted fan comprising the steps of:

generating, using a fan driven by an engine, the fan including an inner first portion separated from an outer second portion, the first portion and second portion defining two concentric but separate flow paths, a flow of air through a duct, enclosing the fan and directing flow of air from the fan, and diverting the flow of air through the two concentric but separate flow paths within the duct and the fan, the flow paths including a first, inner flow path fully open all the time and sized to provide best take off performance wit available horsepower, and ducting air to and from the inner first portion of the fan, and a second, outer flow path, concentric to the first, inner flow path, ducting air to the second outer portion of the fan, the second, outer flow path including a radial array of movable vanes mounted in the duct ahead of the fan, for varying the flow through the second, outer flow path.

* * * * *